United States Patent [19]
Faul et al.

[11] Patent Number: 5,258,460
[45] Date of Patent: Nov. 2, 1993

[54] POLYMERIC REACTION PRODUCTS

[75] Inventors: Dieter Faul, Bad Durkheim; Gerhard Hoffmann, Otterstadt; Klaus Huemke, Friedelsheim; Ulrich Heimann; John A. Gilbert, both of Muenster, all of Fed. Rep. of Germany

[73] Assignee: BASF Lacke+ Farben Aktiengesellschaft, Muenster, Fed. Rep. of Germany

[21] Appl. No.: 856,828

[22] Filed: Mar. 25, 1992

Related U.S. Application Data

[63] Continuation of Ser. No. 747,026, Aug. 19, 1991, abandoned.

[30] Foreign Application Priority Data

Sep. 14, 1990 [DE] Fed. Rep. of Germany ....... 4029199

[51] Int. Cl.$^5$ .............................................. C08L 63/02
[52] U.S. Cl. .................. 525/113; 204/181.9; 428/462; 525/407; 525/417
[58] Field of Search ........................ 525/113, 407, 410; 523/414, 415, 416, 417, 420; 204/181.7

[56] References Cited

U.S. PATENT DOCUMENTS 5,051,160  9/1991  Schwerzel et al. ................ 523/402

FOREIGN PATENT DOCUMENTS

| 0070550 | 1/1983 | European Pat. Off. . |
| 0224411 | 6/1987 | European Pat. Off. . |
| 0262746 | 3/1988 | European Pat. Off. . |
| 3906145 | 6/1990 | Fed. Rep. of Germany . |
| 58-047063 | 3/1983 | Japan . |
| WO88/10276 | 6/1988 | PCT Int'l Appl. . |

Primary Examiner—Melvyn I. Marquis
Assistant Examiner—D. Aylward
Attorney, Agent, or Firm—Oblon, Spivak, McClelland, Maier & Neustadt

[57] ABSTRACT

Polymeric reaction products useful as additions to electrocoating baths are obtainable from A. a polyoxyalkylene which has an average molecular weight $\overline{M}_n$ of from 140 to 10,000 and contains on average from 1.5 to 3.0 primary and/or secondary amino groups and B. a polymer which is based on a conjugated diene, has an average molecular weight $\overline{M}_n$ of from 250 to 50,000, contains on average from 1.5 to 3.0 epoxy groups per molecule and is obtainable by reacting a hydroxyl- or carboxyl-containing polymer with a glycidyl compound.

7 Claims, No Drawings

POLYMERIC REACTION PRODUCTS

This application is a continuation of application Ser. No. 07/747,026, filed on Aug. 19, 1991, now abandoned.

The present invention relates to polymeric reaction products which are obtainable from A. a polyoxyalkylene which has an average molecular weight $\overline{M}_n$ of from 140 to 10,000 and contains on average from 1.5 to 3.0 primary and/or secondary amino groups and B. a polymer which is based on a conjugated diene, has an average molecular weight $\overline{M}_n$ of from 250 to 50,000, contains on average from 1.5 to 3.0 epoxy groups per molecule and is obtainable by reacting a hydroxyl- or carboxyl-containing polymer with a glycidyl compound, the amount of (A) being such that from 1.3 to 3.0 amino groups of component (A) are present per epoxy group of component (B).

The present invention further relates to aqueous dispersions which contain such polymeric reaction products and to the use of such dispersions as addition to standard electrocoating baths.

Automakers have in recent years become more vocal in demanding cathodically depositable basecoats for multi-coat autopaint systems which confer on these paint systems not only good corrosion resistance but also a high stone chip resistance. There are essentially two reasons why they demand better stone chip resistance:

the switch away from salt to grit or grit/salt mixtures for use on the roads in winter; and the aerodynamically dictated ever lower flat front ends of automobiles.

EP-B-70550 describes aqueous cathodic coating dispersions in which synthetic resins which are obtainable by reacting polyepoxies based on bisphenol A with polyoxyalkylenepolyamines are used as binders.

German Patent Application P 3906145.0 discloses two-phase cathodic electrocoatings obtained by depositing a mixture of two dispersions whose respective binders are incompatible with each other.

However, existing stems fall short of meeting expectations of excellent stone chip resistance coupled with good corrosion protection and high levels of all the other application properties.

It is an object of the present invention to develop systems which have excellent properties not only in respect of stone chip resistance but also in respect of corrosion resistance.

We have found that this object is achieved by the polymeric reaction products defined at the beginning.

Suitable components (A) are polyoxyalkylene derivatives which on average contain from 1.5 to 3.0, preferably from 1.8 to 2.2, primary and/or secondary amino groups and have an average molecular weight $\overline{M}_n$ of from 140 to 10,000, preferably from 300 to 6000, particularly preferably from 350 to 1100.

The preparation of such amino-containing polyoxyalkylenes is common knowledge. They can be prepared for example by Michael addition of acrylonitrile to hydroxyl-terminated polyoxyalkylenes with subsequent hydrogenation of the nitrile group, or by direct reaction of the OH-functionalized compounds with excess ammonia.

Suitable polyoxyalkylenes are those compounds whose alkylene moiety contains from 1 to 12 carbon atoms, for example polyethylene oxide, polypropylene oxide or preferably polytetrahydrofuran.

Particularly preferred amino-containing polyoxyalkylenes are those which have an unsubstituted methylene group, in the a-position relative to a primary amino group, such as bis(2-aminoethyl)polyethylene oxide, bis(3-aminopropyl)polyethylene oxide, bis(2-aminoethyl)polypropylene oxide, bis(3-aminopropyl)polypropylene oxide or preferably bis(2-aminoethyl)polytetrahydrofuran or bis(3-aminopropyl)polytetrahydrofuran.

Suitable components (B) are polymers which are based on conjugated dienes, have a molecular weight $\overline{M}_n$ of from 250 to 50,000, contain on average from 1.5 to 3.0 epoxy groups per molecule and are obtainable by reacting hydroxyl- or carboxyl-carrying polymers with glycidyl compounds.

The conjugated diene polymers can be obtained by free radical polymerization under commonly known conditions. Suitable diene monomers are for example isoprene and butadiene, of which butadiene is preferred.

There may also be included monoolefinically unsaturated monomers such as styrene, acrylic acid, acrylic esters with mono- or dialcohols, acrylonitrile or isobutylene as comonomers, of which acrylonitrile is preferred.

The proportion of comonomer in a copolymerization is may in general, depending on the nature of the comonomer, be up to 45% by weight, based on the total weight of monomers, the proportion of comonomer being determined in such a way that the glass transition temperature of the resulting copolymer comes to lie within the range from $-70°$ to $-30°$ C., which, as will be known, is an easy matter for the skilled worker.

Preference is given to butadiene/acrylonitrile copolymers having an acrylonitrile content of from 5 to 45% by weight, particularly preferably from 10 to 30% by weight.

Suitable polymers which are based on butadiene will have been functionalized with carboxyl or hydroxyl groups.

The functionalization is effected in a conventional manner, for example by using a carboxyl-containing free radical initiator such as carboxylated azobisisobutyronitrile in the polymerization.

Functionalization with hydroxyl may be effected for example by reacting a carboxyl-functionalized polymer with ethylene oxide.

By reaction with glycidyl compounds which are capable of reacting with the functional groups it is possible to introduce epoxy-containing groups into the Polymer molecules.

For instance, the hydroxyl-functionalized polymers can be epoxy-modified by reaction with epihalohydrin in an alkaline medium.

Carboxyl-functionalized polymers can be converted into the corresponding epoxy-modified compounds by reaction with polyglycidyl ethers which contain from 1.5 to 3.0 epoxy groups on average, of which diglycidyl ethers are preferred.

Suitable polyglycidyl ethers are for example the diglycidyl ethers of aliphatic $C_2-C_{18}$-diols such as ethylene glycol, propylene glycol, butanediol, pentanediol or hexanediol or polyglycidyl ethers of monocyclic or polycyclic aromatic compounds which contain two or more phenolic hydroxyl groups such as hydroquinone, 2,2-bis(4-hydroxyphenyl)propane (bisphenol A), bis(4-hydroxyphenyl)methane (bisphenol F), 4,4'-dihydroxybenzophenone, 4,4'-dihydroxybenzosulfone or 1,5-dihydroxynaphthalene.

Such glycidyl ethers can likewise be prepared in a conventional manner by etherification with epihalohydrin in alkaline medium.

The reaction of the amino-containing polyoxyalkylene components (A) with the epoxy-modified polymers (B) is in general carried out in an organic solvent or solvent mixture which is inert not only toward amino groups but also toward epoxy groups at 20°–150° C., preferably 50°–110° C. Suitable solvents are toluene, xylene, benzene, methyl isobutyl ketone and tetrahydrofuran, of which toluene is preferred.

The reaction time may vary within the range from 1 to 16 hours, the end point of the reaction having been reached when the epoxy value is virtually equal to zero, which is easy to determine in any particular case.

Normally, the reaction is carried out under atmospheric pressure.

The amounts of components (A) and (B) are determined in such a way that from 1.3 to 3.0, preferably from 1.7 to 2.3, amino equivalents of component (A) are present per epoxy equivalent of component (B).

The polymeric reaction products thus obtained generally have amino numbers of from 10 to 100 mg, preferably from 20 to 60 mg, of KOH/g of solid substance.

The average molecular weight $\overline{M}_n$ may range from 500 to 150,000.

After the epoxide-amine reaction, the amino groups may be wholly or partly neutralized with acid and the protonated resin be dispersed in water. A suitable acid is phosphoric acid, but preference is given to organic acids, for example formic acid, acetic acid, propionic acid and lactic acid. It is also possible to add the resin to a water/acid mixture and to disperse it therein by stirring. Thereafter the organic solvents can be distilled off azeotropically.

The dispersions thus obtained have a solids content of from 15 to 40% and can be added to standard electrocoating baths.

For this dispersions are used in amounts of from 5 to 30% by weight, preferably from 8 to 20% by weight, based on the polymer content of the electrocoating bath.

Suitable standard electrocoating baths generally contain polymers with pendant primary, secondary or tertiary amino groups as the principal resin component. It is also possible to use resins which have pendant phosphonium or sulfonium groups. Generally, these resins additionally contain functional groups, for example hydroxyl groups or unsaturated double bonds.

Suitable resins of this type, the molecular weight of which is preferably within the range from 2000 to 200,000, are chain growth polymers, e.g. aminoacrylate and aminomethacrylate resins, polyadducts such as aminopolyurethane resins and polycondensates such as aminoepoxy resins.

The resins for basecoat primers intended to confer good corrosion protection properties are preferably amino-epoxy resins. Amino-epoxy resins are described for example in EP-A-134 983, EP-A-165 556, EP-A-167 029, DE-A-34 22 457 and DE-A-34 44 410.

They are obtained in a conventional manner by reacting epoxide-containing resins with saturated and/or unsaturated primary and/or secondary amines or amino alcohols. Suitable epoxy resins are compounds which on average have from 1.5 to 3, preferably 2, epoxy groups per molecule and average molecular weights of from 300 to 6000. Of particular suitability are glycidyl ethers of polyphenols which on average contain 2 hydroxyl groups per molecule, the preferred phenol component being 2,2-bis(4-hydroxyphenyl)propane (bisphenol A).

Epoxy resins of higher molecular weight are obtained by reacting the abovementioned diglycidyl ethers with a polyphenol such as 2,2-bis(4-hydroxyphenyl)propane and then with epichlorohydrin to give polyglycidyl ethers.

The amino-epoxy resins may also have been modified with saturated or unsaturated polycarboxylic acids, for example with adipic acid, fumaric acid or dimeric fatty acid.

The resins used may also have been additionally reacted with half-blocked isocyanates and have self-crosslinking properties. Such resins are described, for example in EP-A-273 247 and U.S. Pat. No. 4,692,503.

If the resins do not have any self-crosslinking groups, a crosslinker must be added before the dispersing.

Suitable crosslinkers for these resins are for example urea condensation products as described in DE-A-33 11 514 or phenolic Mannich bases as described in DE-A-34 22 457. EP-A-134 983 also mentions as further possible crosslinkers blocked isocyanates or amino resins such as urea-formaldehyde resins, melamine resins or benzoguanamine resins.

Standard electrocoating baths may further contain pigment pastes and customary assistants. Pigment pastes are obtainable for example from a milling resin and pigments such as titanium dioxide, carbon black or aluminum silicates and also auxiliary and dispersing agents. Suitable milling resins are described for example in EP-A-107 089 and EP-A-251 772.

The deposition of the paint film in cathodic electrocoating customarily takes place at 20°–35° C., preferably 26°–32° C., in the course of 5–500 sec, preferably 60–300 sec, at deposition voltages of 50–500 V. The article to be coated is connected as the cathode.

Afterwards the paint films may be baked at 120°–210° C., preferably 140°–180° C.

The cured cathodically deposited coats are two-phased and, according to differential scanning calorimetry (DSC) measurements, have two different ranges of glass transition temperatures $T_G$. One range extends from $-70°$ to $-20°$ C. and the other from $+50°$ to $+100°$ C., the low $T_G$ values being due to the additions of the present invention and the high $T_G$ values to the standard binders.

The coatings of the present invention possess excellent elasticity and corrosion resistance and are highly suitable for use as basecoats for multicoat paint systems on which they confer not only good corrosion protection properties but also good resistance to stone chipping.

Such a multicoat paint system may comprise for example three coats: first a cathodically deposited basecoat, then a customary filling coat, for example based on polyester, and thirdly a topcoat produced from a commercial topcoating composition.

To determine the stone chip resistance of coatings it is possible to use not only single impact but also multi impact testers (cf. Erichsen VA stone chip tester model 508 (1983); VW test method 3.14.3 (1982); Renault test method No. 1081 (1973); DIN 53 154 (1974), ASTM D-2794-69; A. Zosel, farbe+lack 83 (1977), 9; E. Ladstädter, farbe+lack 90 (1984), 646; A 1683/83.

The paint systems with the cathodic basecoats of the present invention were tested using the "Daimler-Benz pecker" test (DIN 55 995, method A; Erichsen model 490 (1981)) at −20° C.

The test was carried out on a 3-coat structure (cathodic electrobasecoat/filler/topcoat). Two values are determined: the area of topcoat and filler removed in mm² with the basecoat intact, and the degree of rusting, rated on a scale from 0 to 5, to indicate the number and the extent of penetrations through to the metal.

Besides using them as additions to electrocoating baths, the polymeric reaction products of the present invention, or dispersions thereof, may also be used as additives for other coating compositions, for example for waterborne basecoats or coatings for plastics.

Preparation of Polymeric Reaction Products of the Present Invention

General Method

Preparation of Epoxy-Terminated Butadiene-Acrylonitrile Copolymers 2003 g of a carboxyl-terminated BU/AN copolymer having an average molecular weight $\overline{M}_n$ of 3600 and an acrylonitrile content of 17% by weight were mixed with 376 g of bisphenol A diglycidyl ether having an epoxy equivalent weight EEW of about 190 by stirring and then stirred at 130° C. for a further 5.5 h, until the reaction had ended with an acid number of <1 mg of KOH/g of solid substance.

The polytetrahydrofurandiamines listed in Table 1 were used as amino-containing polyoxyalkylene component.

The epoxy-modified butadiene-acrylonitrile copolymer was dissolved in toluene, admixed with the respective polytetrahydrofurandiamine and stirred for several hours (see Table 2) at the temperature indicated therein until the epoxy value was virtually equal to

TABLE 1

| Example | Polytetrahydrofurandiamine | $\overline{M}_n$ | AEW |
|---|---|---|---|
| P1 | Bis(4-aminobutyl)polytetrahydrofuran | 5200 | 3117 |
| P2 | Bis(3-aminopropyl)polytetrahydrofuran | 2100 | 1057 |
| P3 | Bis(3-aminopropyl)polytetrahydrofuran | 1100 | 532 |
| P4 | Bis(3-aminopropyl)polytetrahydrofuran | 750 | 376 |
| P5 | Bis(3-aminopropyl)polytetrahydrofuran | 350 | 177 |

TABLE 2

| Example | H1 | H2 | H3 | H4 | H5 | H6 | H7 | H8 |
|---|---|---|---|---|---|---|---|---|
| Poly-THF-diamine | P1 | P2 | P3 | P3 | P4 | P4 | P4 | P5 |
| [g] | 498.7 | 338.1 | 236.7 | 213.0 | 188.0 | 170.4 | 112.8 | 113.5 |
| Epoxy-terminated Bu-AN copolymer [g] | 160.0 | 320.0 | 444.4 | 470.6 | 500.0 | 533.3 | 409.5 | 655.2 |
| Toluene [g] | 282.3 | 282.3 | 291.9 | 293.0 | 294.9 | 301.6 | 227.7 | 329.4 |
| Reaction temperature [°C.] | 100 | 100 | 100 | 100 | 100 | 105 | 105 | 80 |
| Reaction time [h] | 16 | 13 | 10 | 9 | 11 | 7 | 2 | 3 |
| Amine number [mg of KOH/g of solid substance] | 13.7 | 27.2 | 31.5 | 30.0 | 37.9 | 35.0 | 33.8 | 46.9 |

Preparation of Dispersions D1 to D6 from Polymeric Reaction Products H3 to H8

General Method

The polymeric reaction products H3 to H8 are diluted with the amounts of isobutanol and ethylene glycol monobutyl ether indicated in Table 3, cooled to 40° C., neutralized with acetic acid and then dispersed with the stated amount of deionized water. Then a large proportion of the organic solvents is distilled off azeotropically under reduced pressure and at the same time the solids content is adjusted with deionized water.

TABLE 3

| Example | D1 | D2 | D3 | D4 | D5 | D6 |
|---|---|---|---|---|---|---|
| Amount of resin solution [g] | H3 285.7 | H4 333.3 | H5 285.7 | H6 333.3 | H7 400.0 | H8 285.7 |
| Isobutanol [g] | 102.9 | 60.3 | 102.9 | 60.3 | 265.9 | 73.1 |
| Ethylene glycol monobutyl ether [g] | 11.4 | 6.3 | 11.4 | 6.3 | 29.5 | 41.2 |
| Acetic acid [g] | 3.4 | 3.2 | 4.1 | 3.2 | 3.6 | 5.0 |
| Water [g] | 600.0 | 600.0 | 600.0 | 600.0 | 600.0 | 600.0 |
| Solids content [% by weight] | 30.3 | 28.6 | 25.8 | 26.6 | 24.4 | 20.7 |

Electrocoating Baths

A. Preparation of Standard Electrocoating Components as Described in German Patent Application P 3906144.2 a) Preparation of Basic Resin a1) A mixture of 5800 g of hexamethylenediamine, 7250 g of dimeric fatty acid and 1400 g of linseed oil fatty acid were slowly heated to 195° C. while the water formed (540 g) was distilled off. The mixture was then cooled back to 100° C. and diluted with 5961 g of toluene to a solids content of 70% by weight. The product had an amine number of 197 mg of KOH/g of substance.

a2) In a second stirred vessel, 10 equivalents of a diglycidyl ether based on bisphenol A and epichlorohydrin which had an equivalent weight of 485 were dissolved in a solvent mixture of 1039 g of toluene and 1039 g of isobutanol by heating. The solution thus formed was cooled back to 60° C. and admixed with 300.4 g of methylethanolamine and 128 g of isobutanol, and the temperature rose to 78° C. in the course of 5 min. 1850 g of the condensation product obtained as per a1) were added and the mixture was heated to 80° C. for 2 hours.

b) Preparation of Pigment Paste 525.8 g of the binder obtained as per a) were admixed with 168.7 g of butylglycol, 600 g of water and 16.5 g of acetic acid. Then 800 g of titanium dioxide, 11 g of carbon black and 50 g of basic lead silicate were added and the mixture was ball milled to a particle size of less than 9 μm. Then it was adjusted with water to a 2.5 solids content of 47% by weight.

c) Preparation of Crosslinker

A mixture of 1.32 kg of toluene, 0.42 kg of trimethylolpropane and 0.72 kg of bisphenol A was stirred at 60° C. until a homogeneous solution had formed. This solution was added to a hot mixture at 60° C. of 3.45 kg of isophorone diisocyanate, 0.86 kg of toluene and 0.0034 kg of dibutyltin dilaurate. The mixture was held at 60° C. for 2 h and then admixed with 2. 0 kg of dibutylamine, the rate of addition being adjusted in such a way that the temperature of the reaction mixture did not exceed 80° C. Then 1.11 kg of toluene were added and the mixture was subsequently maintained at 80° C. for 1 h.

B. Preparation of Electrocoating Baths

EXAMPLES B1 TO B8

700 g of the binder obtainable as per a) and 300 g of the crosslinker obtainable as per c) were dispersed in the presence of 19 g of acetic acid with sufficient water to produce a dispersion having a solids content of 31% by weight. The organic solvents were then distilled off azeotropically and thereafter the mixture was adjusted with water to a solids content of 35% by weight.

The dispersion thus obtained was mixed with 775 g of the pigment paste obtainable as per b) and varying amounts of the dispersions of the present invention and made up with water to a volume of 5000 ml.

The electrocoating baths were stirred at 30° C. for 168 hours. Zinc-phosphatized test panels made of steel were connected as the cathode and coated for 120 seconds. These coatings were then baked at 155° C. for 20 min.

The compositions of the baths, the coating conditions and the test results are listed in Table 4. Preparation of three-layered coats for determining the stone chip resistance by DBSIT.

The cathodically deposited basecoats obtained as per Examples B1 to B8 were covered by spray application first with a filling coat then with a topcoat. The filling coat applied was the polyester-based BASF filler FC 80-0100 in a thickness of from 35 to 40 μm which was baked at 155° C. for 25 min.

The topcoat was a two-component high solids topcoat FD 73-0782 from BASF, which was applied in a thickness of 35 to 40 μm and baked at 130° C. for 30 min.

The three-layered coatings thus obtained were subjected to the DBSIT stone chip resistance test. The results are listed in Table 4.

TABLE 4

| Example | Electro-coating dispersion [g] | Dispersion of invention [g] | No. | U [V] | LT [μm] | EI [mm] | RI [Nm] | SST [mm] | DBSIT(−) [mm²/R] |
|---|---|---|---|---|---|---|---|---|---|
| B1 | 1974 | — | — | 400 | 25.1 | 6.1 | 1.1 | 1.6 | 7.0/7.5 |
| B2 | 1657 | 226 | D1 | 330 | 21.2 | 9.6 | 3.4 | 1.8 | 7.3/2.0 |
| B3 | 1657 | 240 | D2 | 370 | 22.8 | 6.9 | 3.4 | 1.8 | 4.0/3.5 |
| B4 | 1657 | 266 | D3 | 350 | 23.2 | 8.8 | 6.8 | 1.3 | 4.8/3.5 |
| B5 | 1657 | 256 | D4 | 350 | 22.3 | 8.0 | 9.1 | 1.5 | 5.3/2.0 |
| B6 | 1463 | 512 | D4 | 320 | 25.0 | 8.0 | 18.1 | 1.8 | 2.8/1.5 |
| B7 | 1708 | 281 | D5 | 400 | 24.5 | 7.0 | 5.7 | 2.0 | 5.3/3.0 |
| B8 | 1708 | 331 | D6 | 400 | 27.4 | 7.0 | 3.4 | 1.6 | 5.5/2.0 |

U: deposition voltage
LT: layer thickness
EI: Erichsen indentation
RI: reverse impact, determined with a mandrel impact tester from gardner in accordance with ASTM D 2794
SST: 480 hours' salt spray test on untreated metal, subpenetration in mm in accordance with DIN 50 021
DBSIT (−): Daimler-Benz single impact test at −20° C.; DIN 55 995, method A; Erichsen model 490 (1981).

We claim:

1. A polymeric reaction product obtained from
   A. a polyoxyalkylene which has an average molecular weight $\overline{M}_n$ of from 140 to 10,000 and contains on average from 1.5 to 3.0 primary and/or secondary amino groups and
   B. a polymer which is based on a conjugated diene, has an average molecular weight $\overline{M}_n$ of from 250 to 50,000, contains on average from 1.5 to 3.0 epoxy groups per molecule and is obtained by reacting a hydroxyl or carboxyl-containing polymer with a glycidyl compound selected from the group consisting of epihalohydrin, polyglycidyl ethers which contain from 1.5 to 3.0 epoxy groups on average, diglycidyl ethers of aliphatic $C_2$–$C_{18}$-diols and polyglycidyl ethers of monocyclic or polycyclic aromatic compounds which contain two or more phenolic hydroxyl groups,
   the amount of (A) being such that from 1.3 to 3.0 amino groups of component (A) are present per epoxy group of component (B).

2. A polymeric reaction product as claimed in claim 1 whose component (A) is a polytetrahydrofuran with primary amino groups which contains an unsubstituted methylene group in the α-position relative to the amino group.

3. A polymeric reaction product as claimed in claim 1 whose conjugated diene polymer is a butadiene/acrylonitrile copolymer which has an acrylonitrile content of from 5 to 45% by weight.

4. A process for preparing a polymeric reaction product as claimed in claim 1, which comprises reacting
   A. a polyoxyalkylene which has an average molecular weight $\overline{M}_n$ of from 140 to 10,000 and contains on average from 1.5 to 3.0 primary and/or secondary amino groups and
   B. a polymer which is based on a diene, has an average molecular weight $\overline{M}_n$ of from 250 to 50,000, contains on average from 1.5 to 3.0 epoxy groups per molecule and is obtained by reacting a hydroxyl or carboxyl-containing polymer with a glycidyl compound selected from the group consisting of epihalohydrin, polyglycidyl ethers which contain from 1.5 to 3.0 epoxy groups on average, diglycidyl ethers of aliphatic $C_2$–$C_{18}$-diols and polyglycidyl ethers of monocyclic or polycyclic aromatic compounds which contain two or more phenolic hydroxyl groups, at 20°–150° C. in the presence of an organic solvent, the amount of (A) used being such that from 1.3 to 3.0 amino groups of component (A) are present per epoxy equivalent of component (B).

5. An aqueous dispersion containing from 15 to 40% by weight of a polymeric reaction product as claimed in claim 1.

6. An electrocoating bath containing, based on the total polymer content, from 5 to 30% by weight of a polymeric reaction product as claimed in claim 1.

7. A cathodically electrocoated article obtainable using an electrocoating bath as claimed in claim 6.

* * * * *